(12) United States Patent
Takeuchi et al.

(10) Patent No.: US 9,343,230 B2
(45) Date of Patent: May 17, 2016

(54) CHIP-TYPE ELECTRONIC COMPONENT WITH OUTER ELECTRODES

(71) Applicant: Murata Manufacturing Co., Ltd., Nagaokakyo-shi, Kyoto-fu (JP)

(72) Inventors: Syunsuke Takeuchi, Nagaokakyo (JP); Yutaka Ota, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 14 days.

(21) Appl. No.: 13/866,048

(22) Filed: Apr. 19, 2013

(65) Prior Publication Data

US 2013/0294009 A1 Nov. 7, 2013

(30) Foreign Application Priority Data

May 2, 2012 (JP) ................. 2012-105081

(51) Int. Cl.
| | |
|---|---|
| H01G 4/008 | (2006.01) |
| H01G 4/30 | (2006.01) |
| H01G 4/232 | (2006.01) |
| H01G 4/012 | (2006.01) |
| H01G 4/12 | (2006.01) |

(52) U.S. Cl.
CPC ............. *H01G 4/008* (2013.01); *H01G 4/0085* (2013.01); *H01G 4/012* (2013.01); *H01G 4/232* (2013.01); *H01G 4/30* (2013.01); *H01G 4/12* (2013.01); *H01G 4/1218* (2013.01)

(58) Field of Classification Search
CPC ....... H01G 4/232; H01G 4/30; H01G 4/1218; H01G 4/12; H01G 4/008; H01G 4/0085; H01G 4/012

USPC ................. 361/306.3, 321.2, 301.4
See application file for complete search history.

(56) References Cited

U.S. PATENT DOCUMENTS

| | | | |
|---|---|---|---|
| 4,984,130 A * | 1/1991 | Dull et al. ................. 361/321.1 |
| 6,576,497 B2 * | 6/2003 | Ahiko et al. ................. 438/122 |

(Continued)

FOREIGN PATENT DOCUMENTS

| | | | |
|---|---|---|---|
| JP | 62-135427 U | | 8/1987 |
| JP | 2004140183 A | * | 5/2004 |

(Continued)

OTHER PUBLICATIONS

Official Communication issued in corresponding Korean Patent Application No. 10-2013-0047356, mailed on Jun. 27, 2014.

(Continued)

*Primary Examiner* — David M Sinclair
(74) *Attorney, Agent, or Firm* — Keating & Bennett, LLP (57) ABSTRACT

In an electronic component, a body includes top and bottom surfaces, first and second end surfaces, and first and second lateral surfaces. A first outer electrode partially extends over the bottom surface and the first end surface without being disposed on the top surface, the second end surface, and both the lateral surfaces. A second outer electrode partially extends over the bottom surface and the second end surface without being disposed on the top surface, the first end surface, and both the lateral surfaces. An area of a first end surface portion of the first outer electrode disposed on the first end surface and area of a second end surface portion of the second outer electrode disposed on the second end surface are in a range of about 6.6% to about 35.0% of area of the first and second end surfaces, respectively.

19 Claims, 6 Drawing Sheets

(56) References Cited

U.S. PATENT DOCUMENTS

| | | |
|---|---|---|
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 7,697,262 B2 * | 4/2010 | Ritter et al. ............ 361/306.1 |
| 8,184,425 B2 * | 5/2012 | Lee et al. ............ 361/306.3 |
| 2002/0070442 A1 | 6/2002 | Ahiko et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2011/0235232 A1 | 9/2011 | Takeuchi et al. |

FOREIGN PATENT DOCUMENTS

| | | | |
|---|---|---|---|
| JP | 2006-66443 A | | 3/2006 |
| JP | 2009065198 A | * | 3/2009 |
| JP | 2011-210836 A | | 10/2011 |
| JP | 2012069766 A | * | 4/2012 |

OTHER PUBLICATIONS

Official Communication issued in corresponding Japanese Patent Application No. 2012-105081, mailed on Apr. 8, 2014.

* cited by examiner

CHIP-TYPE ELECTRONIC COMPONENT WITH OUTER ELECTRODES

BACKGROUND OF THE INVENTION

1. Field of the Invention

The present invention relates to an electronic component, and more particularly, to a chip-type electronic component mounted on a circuit board.

2. Description of the Related Art

Figure 6:
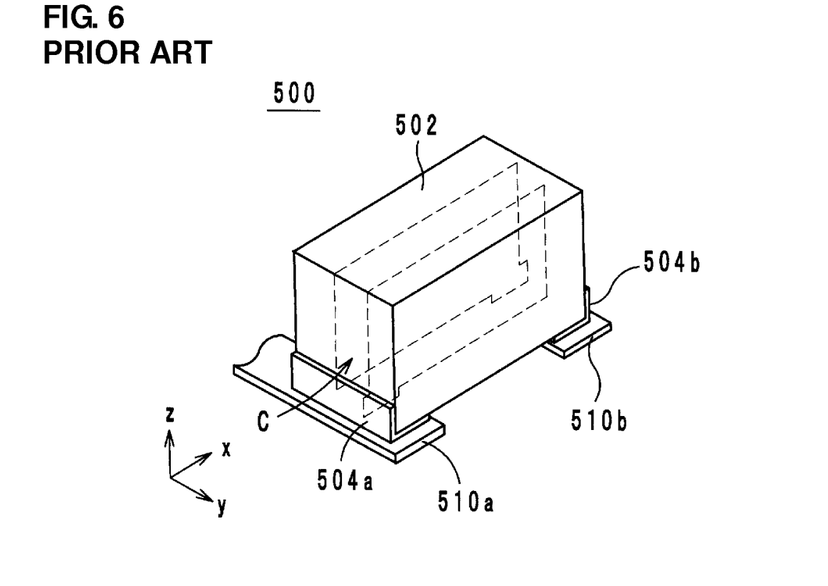
FIG. 6 is a perspective view of a chip-type monolithic ceramic capacitor described in Japanese Unexamined Utility Model Registration Application Publication No. 62-135427.

As a related art electronic component, for example, a chip-type monolithic ceramic capacitor is described in Japanese Unexamined Utility Model Registration Application Publication No. 62-135427. FIG. 6 is a perspective view of the chip-type monolithic ceramic capacitor (hereinafter referred to simply as the "monolithic ceramic capacitor") 500 described in Japanese Unexamined Utility Model Registration Application Publication No. 62-135427. In FIG. 6, a laminating direction is defined as a y-axis direction. When looking at the monolithic ceramic capacitor 500 in a plan view from the y-axis direction, a direction in which a short side of the monolithic ceramic capacitor 500 extends is defined as a z-axis direction, and a direction in which a long side of the monolithic ceramic capacitor 500 extends is defined as an x-axis direction.

The monolithic ceramic capacitor 500 includes, as illustrated in FIG. 6, a laminate 502, outer electrodes 504a and 504b, and a capacitor C. The laminate 502 is formed by laminating a plurality of dielectric layers, each having a substantially rectangular shape, in the y-axis direction. The outer electrode 504a has a substantially L-shape and is arranged to extend over respective portions of a bottom surface of the laminate 502, which is positioned on the negative side in the z-axis direction, and an end surface of the laminate 502, which is positioned on the negative side in the x-axis direction. The outer electrode 504b has a substantially L-shape and is arranged to extend over respective portions of the bottom surface of the laminate 502, which is positioned on the negative side in the z-axis direction, and an end surface of the laminate 502, which is positioned on the positive side in the x-axis direction. The capacitor C is incorporated in the laminate 502 and is connected between the outer electrodes 504a and 504b. The monolithic ceramic capacitor 500 is mounted on a circuit board with the outer electrodes 504a and 504b fixed respectively to lands 510a and 510b by soldering.

However, in the monolithic ceramic capacitor 500 described in Japanese Unexamined Utility Model Registration Application Publication No. 62-135427, it is difficult to not only prevent inclination of the monolithic ceramic capacitor 500 relative to the circuit board when the monolithic ceramic capacitor 500 is mounted, but also to prevent formation of a crack in the solder during use.

In more detail, in the monolithic ceramic capacitor 500, solder coated on the lands 510a and 510b extends upwards along respective portions of the outer electrodes 504a and 504b, which portions are disposed on the end surfaces of the monolithic ceramic capacitor 500. Upwards extending portions of the solder are called "fillets". The fillets pull the monolithic ceramic capacitor 500 towards the negative side in the z-axis direction due to surface tension, thereby pressing the monolithic ceramic capacitor 500 against the circuit board. Therefore, the higher the respective portions of the outer electrodes 504a and 504b in the z-axis direction, which portions are disposed on the end surfaces of the monolithic ceramic capacitor 500, the higher are the fillets in the z-direction and the larger are forces acting from the fillets upon the monolithic ceramic capacitor 500. Thus, the monolithic ceramic capacitor 500 is pressed against the circuit board by stronger forces. As a result, when the monolithic ceramic capacitor 500 is mounted, inclination of the monolithic ceramic capacitor 500 relative to the circuit board is prevented even when impacts are exerted on the circuit board.

However, when the height of each fillet in the z-axis direction increases, stress caused in the solder due to changes in temperature also increase. As a result, there is a risk that a crack may occur in the fillet during use. Thus, as described above, it is difficult to keep preventing inclination of the monolithic ceramic capacitor 500 relative to the circuit board when the monolithic ceramic capacitor 500 is mounted while preventing formation of the crack in the solder during use.

SUMMARY OF THE INVENTION

Accordingly, preferred embodiments of the present invention provide an electronic component that prevents inclination of the electronic component relative to a circuit board when the electronic component is mounted, and that further prevents formation of a crack in solder during use.

According to a preferred embodiment of the present invention, an electronic component includes a substantially rectangular parallelepiped body including a top surface and a bottom surface opposed to each other, a first end surface and a second end surface opposed to each other, and a first lateral surface and a second lateral surface opposed to each other, a first outer electrode disposed to extend over respective portions of the bottom surface and the first end surface, the first outer electrode not being disposed on the top surface, the second end surface, the first lateral surface, or the second lateral surface, and a second outer electrode disposed to extend over respective portions of the bottom surface and the second end surface, the second outer electrode not being disposed on the top surface, the first end surface, the first lateral surface, or the second lateral surface, wherein an area of a first end surface portion of the first outer electrode disposed on the first end surface and an area of a second end surface portion of the second outer electrode disposed on the second end surface are in a range of about 6.6% to about 35.0% of an area of the first end surface and an area of the second end surface, respectively.

Various preferred embodiments of the present invention prevent inclination of the electronic component relative to the circuit board when the electronic component is mounted, and further prevent formation of a crack in a solder during use.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An electronic component according to a preferred embodiment of the present invention will be described below with reference to the drawings.

Figure 1:
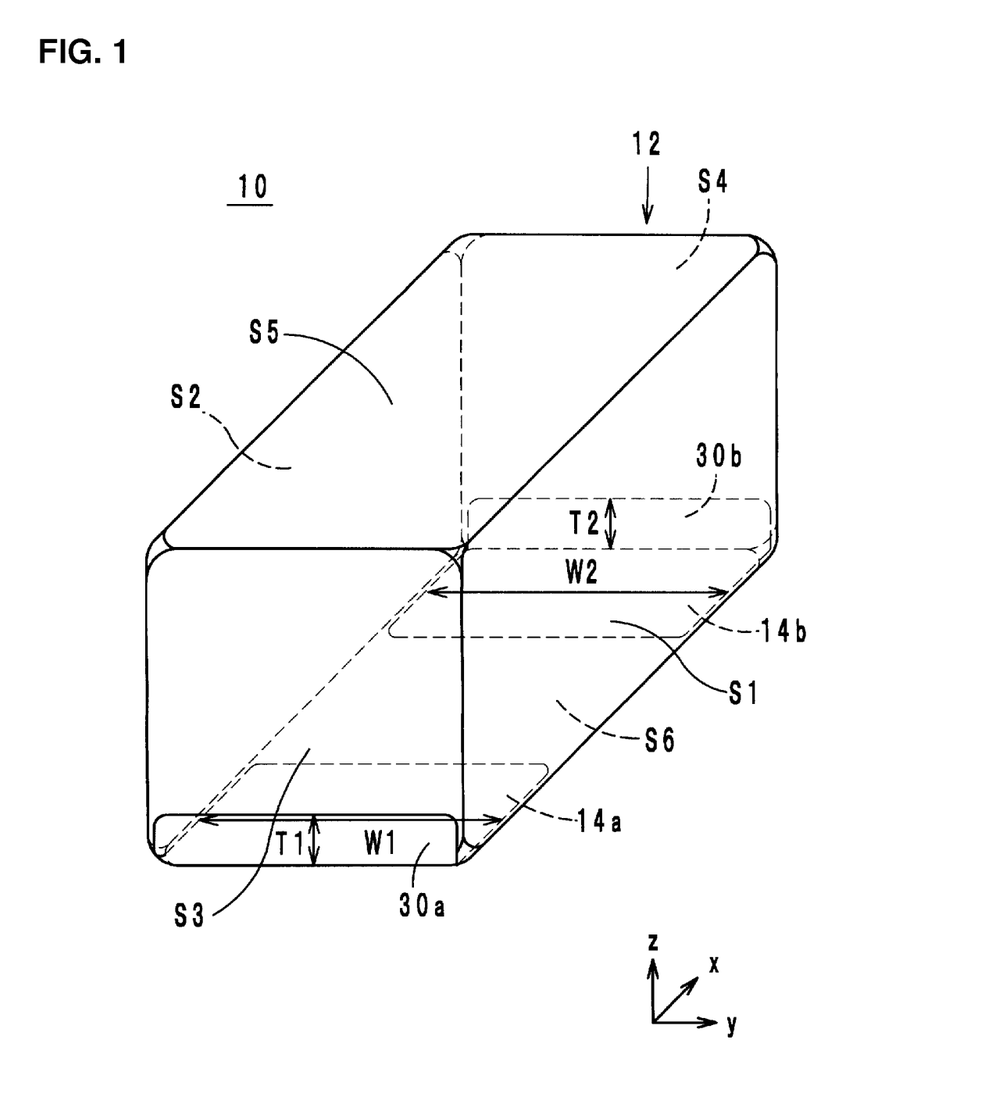
FIG. 1 is an external perspective view of an electronic component according to a preferred embodiment of the present invention.
Figure 2:
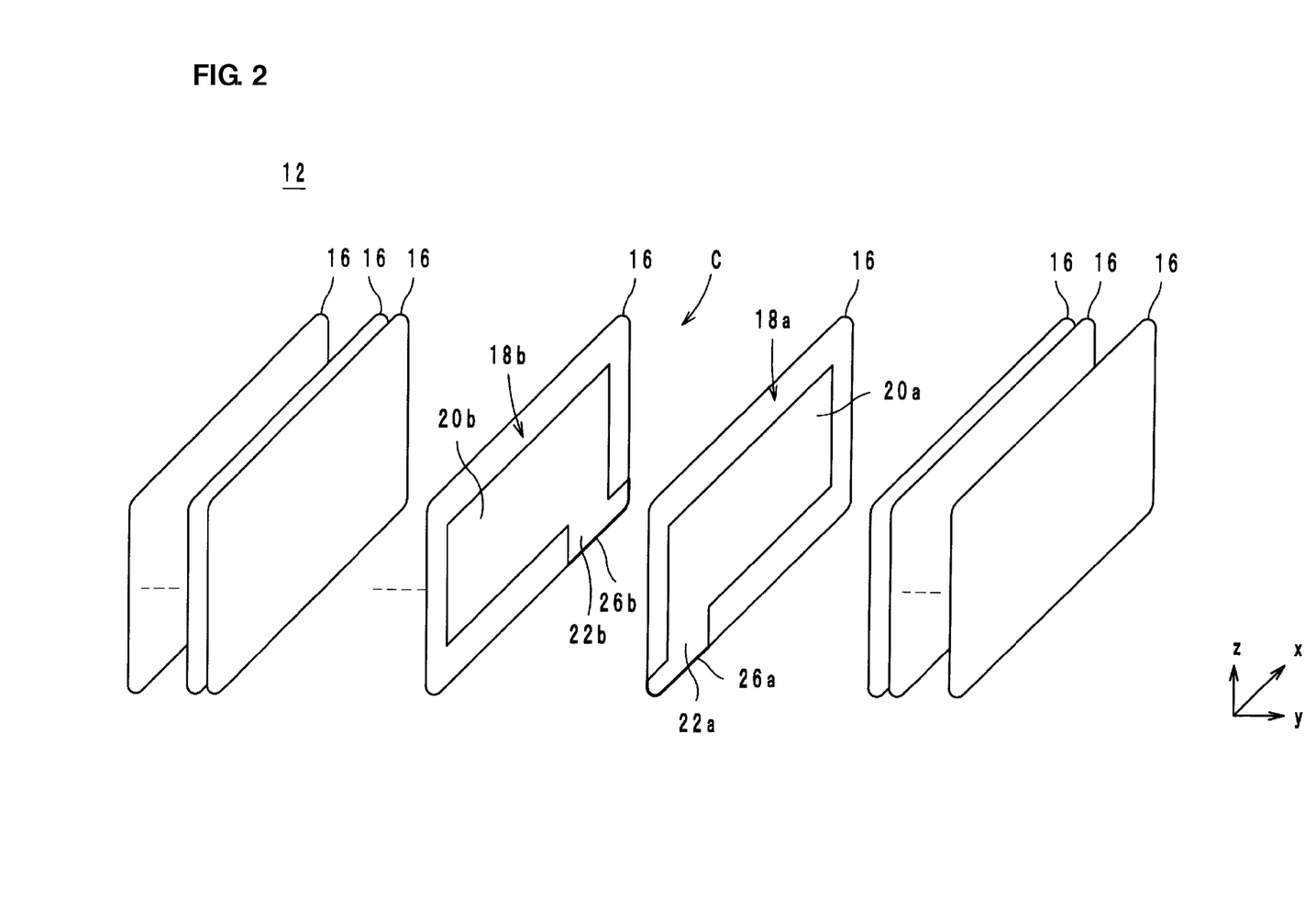
FIG. 2 is an exploded perspective view of a laminate in the electronic component of FIG. 1.

First, the construction of the electronic component is described with reference to the drawings. FIG. 1 is an external perspective view of an electronic component according to the present preferred embodiment of the present invention. FIG. 2 is an exploded perspective view of a laminate 12 in the electronic component 10 of FIG. 1. In the following, a laminating direction of the laminate 12 is defined as a y-axis direction. When viewing the laminate 12 in a plan view in the y-axis direction, a direction of a long side of the laminate 12 is defined as an x-axis direction. When viewing the laminate 12 in a plan view in the y-axis direction, a direction of a short side of the laminate 12 is defined as a z-axis direction.

The electronic component 10 is preferably a chip capacitor, for example. As illustrated in FIGS. 1 and 2, the electronic component 10 includes the laminate (body) 12, outer electrodes 14a and 14b, and a capacitor C (not illustrated in FIG. 1). The laminate 12 preferably has a substantially rectangular parallelepiped shape, for example. However, corners and ridges of the laminate 12 are preferably rounded by chamfering, for example. The laminate 12 includes lateral surfaces S1 and S2, end surfaces S3 and S4, a top surface S5, and a bottom surface S6. The lateral surface S1 is a surface on the positive side in the y-axis direction. The lateral surface S2 is a surface on the negative side in the y-axis direction. The lateral surfaces S1 and S2 are opposed to each other. The end surface S3 is a surface on the negative side in the x-axis direction. The end surface S4 is a surface on the positive side in the x-axis direction. The end surfaces S3 and S4 are opposed to each other. The top surface S5 is a surface on the positive side in the z-axis direction. The bottom surface S6 is a surface on the negative side in the z-axis direction. The top surface S5 and the bottom surface S6 are opposed to each other.

As illustrated in FIG. 2, the laminate 12 includes a plurality of dielectric layers (insulator layers) 16 that are laminated to each other in the y-axis direction (i.e., a direction normal to the lateral surfaces S1 and S2). Each of the dielectric layers 16 preferably has a substantially rectangular shape and is made of a dielectric ceramic, for example. Examples of the dielectric ceramic include $BaTiO_3$, $CaTiO_3$, $SrTiO_3$, and $CaZrO_3$. The dielectric layer 16 may preferably include any of those materials as a main ingredient and any of a Mn compound, a Fe compound, a Cr compound, a Co compound, and a Ni compound as a minor ingredient, for example. A thickness of the dielectric layer 16 is preferably in a range of about 0.5 μm to about 10 μm, for example. In the following, a principal surface of the dielectric layer 16 on the positive side in the y-axis direction is denoted as a "front surface", and a principal surface of the dielectric layer 16 on the negative side in the y-axis direction is denoted as a "rear surface".

Thus, the lateral surface S1 of the laminate 12 is defined by the front surface of the dielectric layer 16 that is disposed on the most positive side in the y-axis direction. The lateral surface S2 of the laminate 12 is defined by the rear surface of the dielectric layer 16 that is disposed on the most negative side in the y-axis direction. Furthermore, the end surface S3 is defined by the short sides of the dielectric layers 16 on the negative side in the x-axis direction, those short sides being successively positioned close to each other. The end surface S4 is defined by the short sides of the dielectric layers 16 on the positive side in the x-axis direction, those short sides being successively positioned close to each other. The top surface S5 is defined by the long sides of the dielectric layers 16 on the positive side in the z-axis direction, those long sides being successively positioned close to each other. The bottom surface S6 is defined by the long sides of the dielectric layers 16 on the negative side in the z-axis direction, those long sides being successively positioned close to each other.

As illustrated in FIG. 2, the capacitor C includes capacitor conductors (inner conductors) 18a and 18b incorporated in the laminate 12. Each of the capacitor conductors 18 is preferably made of, e.g., a conductive material, such as Ni, Cu, Ag, Pd, an Ag—Pd alloy, or Au, for example. Preferably, the capacitor conductors 18a and 18b have a thickness in a range of about 0.3 μm to about 2.0 μm, for example.

The capacitor conductor 18a is disposed on the front surface of the dielectric layer 16, and it includes a capacity portion 20a and a lead-out portion 22a. The capacity portion 20a preferably has a substantially rectangular shape and is positioned inward of an outer edge of the dielectric layer 16 without extending up to the outer edge.

The lead-out portion 22a projects towards the negative side in the z-axis direction from a long side of the capacity portion 20a on the negative side in the z-axis direction at a position near an end of that long side on the negative side in the x-axis direction, and also projects towards the negative side in the x-axis direction from a short side of the capacity portion 20a on the negative side in the x-axis direction at a position near an end of that short side on the negative side in the z-axis direction. The lead-out portion 22a is led out to the long side of the dielectric layer 16 on the negative side in the z-axis direction and is also led out to the short side of the dielectric layer 16 on the negative side in the x-axis direction. Furthermore, the lead-out portion 22a is led out to a corner at which the above-mentioned long side and the above-mentioned short side of the dielectric layer 16 intersect. The lead-out portion 22a includes an exposed portion 26a that is exposed between adjacent two of the dielectric layers 16 in the end surface S3 and the bottom surface S6 of the laminate 12.

The capacitor conductor 18b is disposed on the front surface of the dielectric layer 16 and includes a capacity portion 20b and a lead-out portion 22b. The capacity portion 20b preferably has a substantially rectangular shape and is positioned inward of an outer edge of the dielectric layer 16 without extending up to the outer edge.

The lead-out portion 22b projects towards the negative side in the z-axis direction from a long side of the capacity portion 20b on the negative side in the z-axis direction at a position near an end of that long side on the positive side in the x-axis direction, and also projects towards the positive side in the x-axis direction from a short side of the capacity portion 20b on the positive side in the x-axis direction at a position near an end of that short side on the negative side in the z-axis direction. The lead-out portion 22b is led out to the long side of the dielectric layer 16 on the negative side in the z-axis direction and is also led out to the short side of the dielectric layer 16 on the positive side in the x-axis direction. Furthermore, the lead-out portion 22b is led out to a corner at which the above-mentioned long side and the above-described short side of the dielectric layer 16 intersect. The lead-out portion 22b includes an exposed portion 26b that is exposed between adjacent two of the dielectric layers 16 in the end surface S4 and the bottom surface S6 of the laminate 12.

The capacitor conductors 18a and 18b are disposed on the dielectric layers 16 to be alternately positioned in the y-axis direction. With such an arrangement, the capacitor C is defined in a portion in which the capacitor conductor 18a and the capacitor conductor 18b are opposed to each other with the dielectric layer 16 interposed therebetween.

The outer electrode 14a is arranged to extend over respective portions of the end surface S3 and the bottom surface S6 of the laminate 12 while covering the exposed portion 26a. However, the outer electrode 14a does not protrude from the end surface S3 or the bottom surface S6, and it is not disposed on the lateral surfaces S1 or S2, the end surface S4, or the top surface S5. Accordingly, the outer electrode 14a preferably has a substantial L-shape when viewing the outer electrode 14a in a plan view in the y-axis direction.

The outer electrode 14a includes a first plating film that is directly connected to the capacitor conductors 18a and 18b. The first plating film preferably includes an underlying plating film and an upper plating film provided on the underlying plating film. The first plating film is preferably formed by a plating process, for example.

The underlying plating film and the upper plating film are each preferably formed by plating, e.g., one type of metal selected from among a group consisting of Cu, Ni, Sn, Pb, Au, Ag, Pd, Bi and Zn, or an alloy containing any of those metals. For example, when the capacitor conductors 18a and 18b are made of Ni, the underlying plating film is preferably made of Cu that has good bonding properties with respect to Ni. The upper plating film is preferably made of Sn or Au that has good wetting properties with respect to the solder, and the underlying plating film is preferably made of Ni that has a barrier function against the solder.

Preferably, the underlying plating film and the upper plating film include no glass components, and a metal content of each plating film per unit volume is about 99% by volume or more, for example.

It is to be noted that the upper plating film is preferably provided when required, and that the outer electrode may include only the underlying plating film.

A thickness of each plating film per layer is preferably in a range of about 1 μm to about 15 μm, for example.

Alternatively, the outer electrode 14a may be formed by baking a conductive paste, for example.

Moreover, a portion of the outer electrode 14a, which is disposed on the end surface S3, is denoted as an "end surface portion 30a". An area of the end surface portion 30a is preferably in a range of about 6.6% to about 35.0%, for example, of that of the end surface S3. In the outer electrode 14a, a width of the end surface portion 30a in the y-axis direction is denoted as a "width W1". In the outer electrode 14a, a height of the end surface portion 30a in the z-axis direction is denoted as a "height T1".

The outer electrode 14b is arranged to extend over respective portions of the end surface S4 and the bottom surface S6 of the laminate 12 while covering the exposed portion 26b. However, the outer electrode 14b does not protrude from the end surface S4 or the bottom surface S6, and it is not disposed on the lateral surfaces S1 or S2, the end surface S3, or the top surface S5. Accordingly, the outer electrode 14b preferably has a substantial L-shape when viewing the outer electrode 14b in a plan view in the y-axis direction.

The outer electrode 14b includes a second plating film that is directly connected to the capacitor conductors 18a and 18b. The second plating film preferably includes an underlying plating film and an upper plating film provided on the underlying plating film. The second plating film is preferably formed by a plating process, for example.

The underlying plating film and the upper plating film are each preferably formed by plating, e.g., one type of metal selected from among a group consisting of Cu, Ni, Sn, Pb, Au, Ag, Pd, Bi and Zn, or an alloy containing any of those metals. For example, when the capacitor conductors 18a and 18b are made of Ni, the underlying plating film is preferably made of Cu that has good bonding properties with respect to Ni. The upper plating film is preferably made of Sn or Au that has good wetting properties with respect to the solder, and the underlying plating film is preferably made of Ni that has a barrier function against the solder.

Preferably, the underlying plating film and the upper plating film include no glass components, and a metal content of each plating film per unit volume is about 99% by volume or more.

It is to be noted that the upper plating film is preferably provided when required, and that the outer electrode may include only the underlying plating film.

A thickness of each plating film per layer is preferably in a range of about 1 μm to about 15 μm, for example.

Alternatively, the outer electrode 14b may be formed by baking a conductive paste, for example.

Moreover, a portion of the outer electrode 14b, which is disposed on the end surface S4, is denoted as an "end surface portion 30b". An area size of the end surface portion 30b is preferably in a range of about 6.6% to about 35.0%, for example, of that of the end surface S4. In the outer electrode 14b, a width of the end surface portion 30b in the y-axis direction is denoted as a "width W2". In the outer electrode 14b, a height of the end surface portion 30b in the z-axis direction is denoted as a "height T2".

Figure 3A:
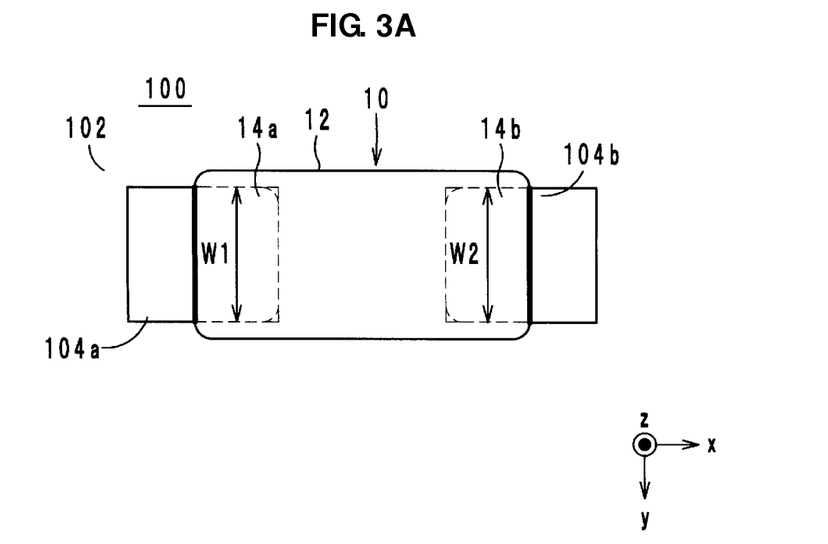
FIGS. 3A and 3B illustrate the electronic component in a state mounted on a circuit board.
Figure 3B:
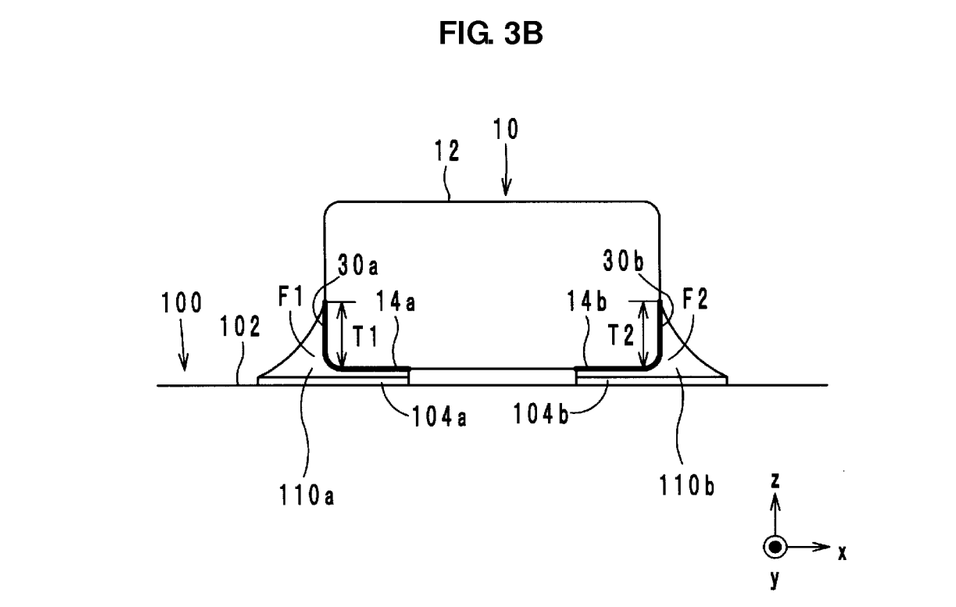

The electronic component 10 is mounted on the circuit board. FIGS. 3A and 3B illustrate the electronic component 10 being mounted on a circuit board 100.

As illustrated in FIGS. 3A and 3B, the circuit board 100 includes a board body 102 and lands 104a and 104b. The board body 102 is preferably, for example, a multilayer circuit board. Each of the lands 104a and 104b is an electrode, which preferably has a substantially rectangular shape, for example, and which is disposed on a principal surface of the board body 102 on the positive side in the z-axis direction.

The electronic component 10 is mounted on the circuit board 100 such that the outer electrodes 14a and 14b are fixed to the lands 104a and 104b by solder 110a and 110b, respectively. In the mounted state, the solder 110a and 110b has fillets F1 and F2 extending toward the positive side in the z-axis direction in the end surface portions 30a and 30b of the outer electrodes 14a and 14b, respectively. The fillets F1 and F2 pull the outer electrodes 14a and 14b toward the negative side in the z-axis direction due to surface tensions, respectively, thereby attracting the electronic component 10 to the circuit board 100.

A method of manufacturing the electronic component according to a preferred embodiment of the present invention will be described below with reference to the drawings, specifically, FIGS. 1 and 2.

First, $BaTiO_3$, $CaTiO_3$, $SrTiO_3$, or $CaZrO_3$ as a main ingredient and a Mn compound, a Fe compound, a Cr compound, a Co compound, or a Ni compound as an accessory ingredient are weighed at a predetermined ratio and are put in a ball mill for wet mixing. The mixture is dried and pulverized, and the resulting powder is calcined. After wet-pulverizing the calcined powder in the ball mill, the pulverized powder is dried and disintegrated so as to obtain dielectric ceramic powder.

An organic binder and an organic solvent are added to the dielectric ceramic powder, and they are mixed together in a ball mill. Resulting ceramic slurry is coated in the form of a sheet on a carrier sheet by the doctor blade method, for example, and is dried to form a ceramic green sheet that is to become the dielectric layer 16. A thickness of the ceramic green sheet to become the dielectric layer 16 is preferably in a range of about 0.5 µm to about 10 µm, for example.

Next, the capacitor conductors 18a and 18b are each formed on the ceramic green sheet, which is to become the dielectric layer 16, by coating a paste made of conductive material with screen printing, photolithography, or another suitable method, for example. The paste made of conductive material is prepared, for example, by adding an organic binder and an organic solvent to metal powder.

Next, a not-yet-fired mother laminate is obtained by laminating the ceramic green sheets that are to become the dielectric layers 16. Thereafter, the not-yet-fired mother laminate is pressed using a hydrostatic press, for example.

Next, the not-yet-fired mother laminate is cut into a predetermined size so as to obtain a plurality of not-yet-fired laminates 12. The surface of each laminate 12 is subjected to barrel grinding to chamfer corners and ridges of the laminate 12.

Next, the not-yet-fired laminate 12 is fired. A firing temperature is preferably in a range of about 900° C. to about 1300° C., for example. Through the above-described steps, the preparation of the fired laminate 12 incorporating the capacitor conductors 18a and 18b therein is completed.

Next, the outer electrodes 14a and 14b are each formed by a plating process. In the present preferred embodiment, the outer electrode 14a and 14b is preferably formed through two steps of strike plating and thick film plating.

The term "strike plating" implies a short-time plating used to improve plating adhesion and to increase coverage power. In the strike plating, the laminate 12 is put in a barrel in which conductive media are loaded. Then, the barrel is immersed in a plating solution and is rotated for a predetermined time. As a result, the conductive media come into contact with the exposed portions 26a and 26b, and electric power is supplied.

In the thick film plating, the laminate 12 is put in a barrel in which conductive media are loaded. Then, the barrel is immersed in a plating solution and is rotated for a predetermined time. As a result, the conductive media come into contact with the exposed portions 26a and 26b, and electric power is supplied.

Through the above-described plating steps, the outer electrodes 14a and 14b, each preferably having a film thickness of about 5 µm, for example, are formed on the exposed portions 26a and 26b and thereabout.

In the electronic component 10 described above, the areas of the end surface portions 30a and 30b are preferably in a range of about 6.6% to about 35.0%, for example, of those of the end surfaces S3 and S4, respectively. With this feature, as seen from experiment results described later, it is possible to not only prevent inclination of the electronic component 10 relative to the circuit board 100 when the electronic component 10 is mounted, but also to prevent formation of a crack in the solder 110a and 110b during use.

In order to clarify the advantageous effects of the electronic component 10, the inventors of the present invention conducted the experiments described below. In more detail, ten samples were fabricated for each lot of 1st to 72nd samples. Each of the 1st to 18th samples had a size of about 1.6 mm×about 0.8 mm×about 0.8 mm. Each of the 19th to 36th samples had a size of about 2.0 mm×about 1.2 mm×about 1.2 mm. Each of the 37th to 54th samples had a size of about 3.2 mm×about 1.6 mm×about 1.6 mm. Each of the 55th to 72nd samples had a size of about 3.2 mm×about 2.5 mm×about 2.5 mm. Conditions common to the 1st to 72nd samples were as follows:

Material of the dielectric layer 16: barium titanate-based dielectric ceramic;

Main ingredient of the capacitor conductors 18a and 18b: nickel.

Values in columns of heights T1, T2 in Tables 1 to 4, provided below, were obtained by placing each sample on a flat plate with one end surface of the sample directed downwards, illuminating the other end surface of the sample with light from above, capturing and binary-processing an image, measuring maximum and minimum lengths of the end surface portion of the outer electrode in the z-axis direction through digital processing of the binary-processed image, and by calculating a middle value of the maximum and minimum lengths. Values in columns of widths W1, W2 of the end surface portions of the outer electrodes in the y-axis direction were also calculated from the above-mentioned binary-processed image through digital processing. The measurements for obtaining those values were performed on one sample for each lot of the 1st to 72nd samples. Respective areas of the end surface portions 30a and 30b can be calculated from the above-mentioned values of T1, T2 and W1, W2.

The following Tables 1 to 4 further indicate lengths of the end surface portions 30a, 30b in the z-axis direction and area rates of the outer electrodes 14a, 14b in the 1st to 72nd samples. Here, the area rates of the outer electrodes 14a and 14b denote percentages of the areas of the end surface portions 30a and 30b with respect to those of the end surfaces S3 and S4, respectively.

The areas of the end surfaces S3 and S4 were each obtained by placing each sample on a flat plate with one end surface of the sample directed downwards, illuminating the other end surface of the sample with light from above, capturing and binary-processing an image, taking a point per pixel along edges of the end surface of the sample through digital processing of the binary-processed image (10 millions pixels), and by counting a total number of pixels that were present within a portion surrounded by lines interconnecting the above-mentioned points. The measurements for obtaining those area values were performed on one sample for each lot of the 1st to 72nd samples.

TABLE 1

|  | W1, W2 (mm) | T1, T2 (mm) | Area Rate (%) |
|---|---|---|---|
| 1st Sample | 0.60 | 0.02 | 1.9 |
| 2nd Sample | 0.60 | 0.06 | 5.6 |
| 3rd Sample | 0.61 | 0.14 | 13.3 |
| 4th Sample | 0.60 | 0.22 | 20.6 |
| 5th Sample | 0.59 | 0.33 | 30.4 |
| 6th Sample | 0.60 | 0.38 | 35.6 |
| 7th Sample | 0.66 | 0.03 | 3.1 |
| 8th Sample | 0.65 | 0.06 | 6.1 |
| 9th Sample | 0.65 | 0.12 | 12.2 |
| 10th Sample | 0.65 | 0.23 | 23.4 |
| 11th Sample | 0.66 | 0.34 | 35.1 |
| 12th Sample | 0.65 | 0.38 | 38.6 |
| 13th Sample | 0.70 | 0.04 | 4.4 |
| 14th Sample | 0.70 | 0.06 | 6.6 |
| 15th Sample | 0.70 | 0.14 | 15.3 |
| 16th Sample | 0.70 | 0.24 | 26.3 |
| 17th Sample | 0.71 | 0.33 | 36.6 |
| 18th Sample | 0.71 | 0.39 | 43.3 |

Chip Size: about 1.6 mm × about 0.8 mm × about 0.8 mm

TABLE 2

| | W1, W2 (mm) | T1, T2 (mm) | Area Rate (%) |
|---|---|---|---|
| 19th Sample | 1.00 | 0.05 | 3.5 |
| 20th Sample | 1.01 | 0.09 | 6.3 |
| 21st Sample | 0.99 | 0.19 | 13.1 |
| 22nd Sample | 1.00 | 0.33 | 22.9 |
| 23rd Sample | 1.00 | 0.48 | 33.3 |
| 24th Sample | 1.00 | 0.54 | 37.5 |
| 25th Sample | 1.04 | 0.04 | 2.9 |
| 26th Sample | 1.05 | 0.07 | 5.1 |
| 27th Sample | 1.05 | 0.19 | 13.9 |
| 28th Sample | 1.05 | 0.35 | 25.5 |
| 29th Sample | 1.05 | 0.48 | 35.0 |
| 30th Sample | 1.05 | 0.54 | 39.4 |
| 31st Sample | 1.10 | 0.04 | 3.1 |
| 32nd Sample | 1.10 | 0.08 | 6.1 |
| 33rd Sample | 1.09 | 0.20 | 15.1 |
| 34th Sample | 1.10 | 0.34 | 26.0 |
| 35th Sample | 1.11 | 0.47 | 36.2 |
| 36th Sample | 1.11 | 0.54 | 41.6 |

Chip Size: about 2.0 mm × about 1.2 mm × about 1.2 mm

TABLE 3

| | W1, W2 (mm) | T1, T2 (mm) | Area Rate (%) |
|---|---|---|---|
| 37th Sample | 1.30 | 0.04 | 2.0 |
| 38th Sample | 1.30 | 0.10 | 5.1 |
| 39th Sample | 1.30 | 0.22 | 11.2 |
| 40th Sample | 1.30 | 0.48 | 24.4 |
| 41st Sample | 1.31 | 0.69 | 35.3 |
| 42nd Sample | 1.32 | 0.76 | 39.2 |
| 43rd Sample | 1.40 | 0.05 | 2.7 |
| 44th Sample | 1.40 | 0.10 | 5.5 |
| 45th Sample | 1.40 | 0.22 | 12.0 |
| 46th Sample | 1.39 | 0.48 | 26.1 |
| 47th Sample | 1.40 | 0.68 | 37.2 |
| 48th Sample | 1.40 | 0.76 | 41.6 |
| 49th Sample | 1.50 | 0.04 | 2.3 |
| 50th Sample | 1.49 | 0.09 | 5.2 |
| 51st Sample | 1.49 | 0.22 | 12.8 |
| 52nd Sample | 1.50 | 0.47 | 27.5 |
| 53rd Sample | 1.48 | 0.67 | 38.7 |
| 54th Sample | 1.50 | 0.75 | 43.9 |

Chip Size: about 3.2 mm × about 1.6 mm × about 1.6 mm

TABLE 4

| | W1, W2 (mm) | T1, T2 (mm) | Area Rate (%) |
|---|---|---|---|
| 55th Sample | 2.20 | 0.09 | 3.2 |
| 56th Sample | 2.20 | 0.16 | 5.6 |
| 57th Sample | 2.20 | 0.41 | 14.4 |
| 58th Sample | 2.19 | 0.75 | 26.3 |
| 59th Sample | 2.19 | 1.01 | 35.4 |
| 60th Sample | 2.20 | 1.16 | 40.8 |
| 61st Sample | 2.30 | 0.09 | 3.3 |
| 62nd Sample | 2.30 | 0.15 | 5.5 |
| 63rd Sample | 2.28 | 0.40 | 14.6 |
| 64th Sample | 2.30 | 0.77 | 28.3 |
| 65th Sample | 2.30 | 1.01 | 37.2 |
| 66th Sample | 2.31 | 1.15 | 42.5 |
| 67th Sample | 2.41 | 0.09 | 3.5 |
| 68th Sample | 2.40 | 0.14 | 5.4 |
| 69th Sample | 2.40 | 0.41 | 15.7 |
| 70th Sample | 2.40 | 0.75 | 28.8 |
| 71st Sample | 2.40 | 1.01 | 38.8 |
| 72nd Sample | 2.39 | 1.15 | 44.0 |

Chip Size: about 3.2 mm × about 2.5 mm × about 2.5 mm

When the 1st to 72nd samples were each mounted, solder was coated on the lands 104a and 104b by using a metal mask with a thickness of about 150 μm. The metal mask had openings having shapes in match with the lands 104a and 104b. The solder in amounts of about 80% to about 90% of respective opening volumes were coated on the lands 104a and 104b. A heating temperature for the solder was set to about 255° C. A Sn—Ag—Cu solder was used as each of the above-mentioned solder.

An inclination incidence and a crack incidence were examined on the 1st to 72nd samples fabricated as described above. The term "inclination incidence" denotes a probability of the occurrence of inclination in the samples mounted on the circuit board 100. The inclination was measured by scanning each sample in the y-axis direction using a laser displacement gauge (KS-1100 made by KEYENCE CORPORATION). When the inclination of the top surface S5 or the bottom surface S6 of the sample relative to the circuit board 100 was about 5 degrees or more, it was determined that the inclination occurred.

The term "crack incidence" denotes a probability of the occurrence of a crack in the samples, the crack extending across any of the solder portions 110a and 110b in the y-axis direction. The crack incidence was measured by putting the circuit board 100, including the sample mounted thereon, in a thermal-shock test tank, repeating 1000 test cycles, each including a step of holding the sample at about −55° C. for about 5 minutes and a step of holding the sample at about 150° C. for about 5 minutes, grinding the sample from the lateral surface S1 or S2 until a section at a half width of the sample in the y-axis direction appeared, and by examining the occurrence of a crack with a microscope. For the sample in which the crack extending across any of the solder portions 110a and 110b in the y-axis direction was observed, it was determined that the crack occurred in the relevant sample. Tables 5 to 8 indicate the obtained experimental results.

TABLE 5

| | Incline Incidence (%) | Crack Incidence (%) |
|---|---|---|
| 1st Sample | 50 | 0 |
| 2nd Sample | 0 | 0 |
| 3rd Sample | 0 | 0 |
| 4th Sample | 0 | 0 |
| 5th Sample | 0 | 0 |
| 6th Sample | 0 | 0 |
| 7th Sample | 30 | 0 |
| 8th Sample | 0 | 0 |
| 9th Sample | 0 | 0 |
| 10th Sample | 0 | 0 |
| 11th Sample | 0 | 0 |
| 12th Sample | 0 | 0 |
| 13th Sample | 30 | 0 |
| 14th Sample | 0 | 0 |
| 15th Sample | 0 | 0 |
| 16th Sample | 0 | 0 |
| 17th Sample | 0 | 0 |
| 18th Sample | 0 | 10 |

TABLE 6

| | Incline Incidence (%) | Crack Incidence (%) |
|---|---|---|
| 19th Sample | 50 | 0 |
| 20th Sample | 0 | 0 |
| 21st Sample | 0 | 0 |
| 22nd Sample | 0 | 0 |
| 23rd Sample | 0 | 0 |
| 24th Sample | 0 | 0 |
| 25th Sample | 40 | 0 |
| 26th Sample | 0 | 0 |
| 27th Sample | 0 | 0 |
| 28th Sample | 0 | 0 |
| 29th Sample | 0 | 0 |
| 30th Sample | 0 | 10 |
| 31st Sample | 40 | 0 |

TABLE 6-continued

| | Incline Incidence (%) | Crack Incidence (%) |
|---|---|---|
| 32nd Sample | 0 | 0 |
| 33rd Sample | 0 | 0 |
| 34th Sample | 0 | 0 |
| 35th Sample | 0 | 0 |
| 36th Sample | 0 | 10 |

TABLE 7

| | Incline Incidence (%) | Crack Incidence (%) |
|---|---|---|
| 37th Sample | 40 | 0 |
| 38th Sample | 0 | 0 |
| 39th Sample | 0 | 0 |
| 40th Sample | 0 | 0 |
| 41st Sample | 0 | 0 |
| 42nd Sample | 0 | 10 |
| 43rd Sample | 30 | 0 |
| 44th Sample | 0 | 0 |
| 45th Sample | 0 | 0 |
| 46th Sample | 0 | 0 |
| 47th Sample | 0 | 0 |
| 48th Sample | 0 | 20 |
| 49th Sample | 40 | 0 |
| 50th Sample | 0 | 0 |
| 51st Sample | 0 | 0 |
| 52nd Sample | 0 | 0 |
| 53rd Sample | 0 | 0 |
| 54th Sample | 0 | 20 |

TABLE 8

| | Incline Incidence (%) | Crack Incidence (%) |
|---|---|---|
| 55th Sample | 20 | 0 |
| 56th Sample | 0 | 0 |
| 57th Sample | 0 | 0 |
| 58th Sample | 0 | 0 |
| 59th Sample | 0 | 0 |
| 60th Sample | 0 | 20 |
| 61st Sample | 20 | 0 |
| 62nd Sample | 0 | 0 |
| 63rd Sample | 0 | 0 |
| 64th Sample | 0 | 0 |
| 65th Sample | 0 | 0 |
| 66th Sample | 0 | 20 |
| 67th Sample | 10 | 0 |
| 68th Sample | 0 | 0 |
| 69th Sample | 0 | 0 |
| 70th Sample | 0 | 0 |
| 71st Sample | 0 | 0 |
| 72nd Sample | 0 | 20 |

As seen from Tables 5 to 8, the inclination incidence increases as the area rate decreases, and the crack incidence increases as the area rate increases. Furthermore, the inclination incidence and the crack incidence are both 0% in the 1st to 72nd samples when the area rate is in the range of about 6.6% to about 35.0%. Thus, the above-described experiments show that, by setting the area rate to be in the range of about 6.6% to about 35.0%, it is possible to not only prevent inclination of the electronic component 10 relative to the circuit board 100 when the electronic component 10 is mounted, but also to prevent formation of a crack in the solders 110a and 110b after the mounting.

Figure 4:
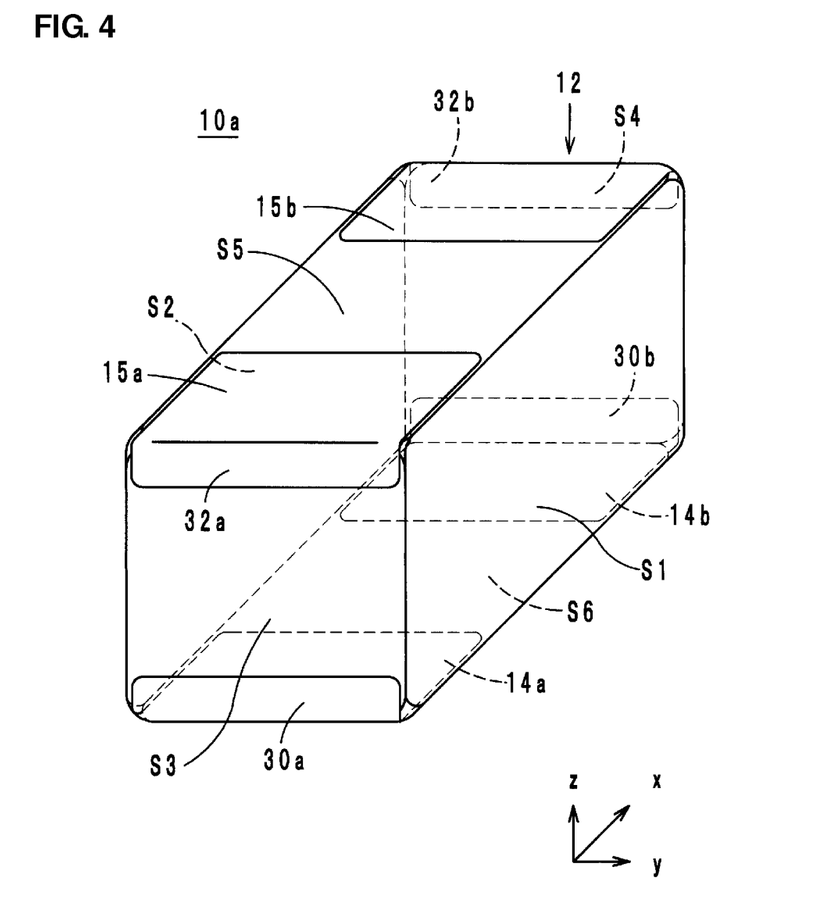
FIG. 4 is an external perspective view of an electronic component according to a modification of a preferred embodiment of the present invention.
Figure 5:
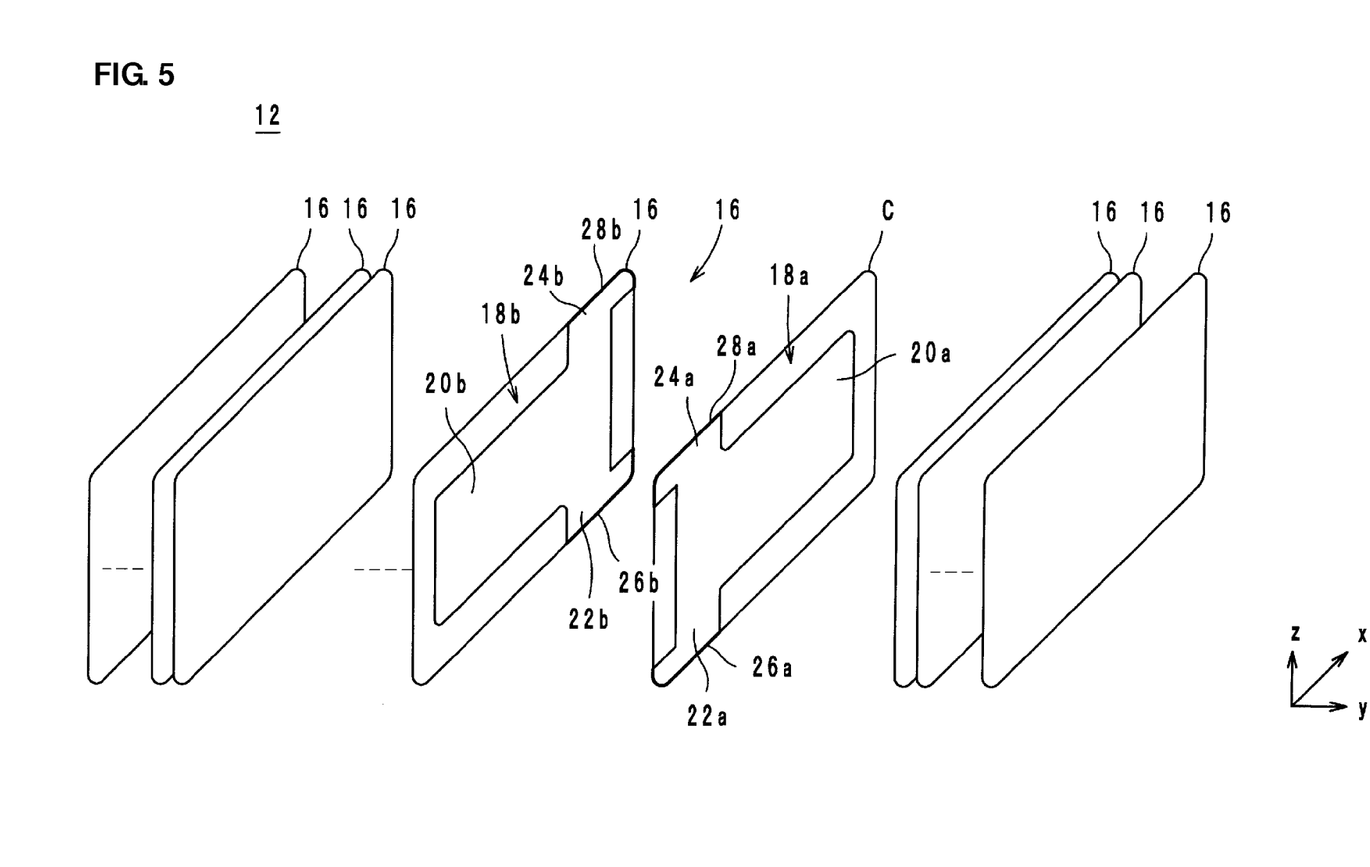
FIG. 5 is an exploded perspective view of a laminate in the electronic component of FIG. 4.

An electronic component according to a modification of a preferred embodiment of the present invention will be described below with reference to the drawings. FIG. 4 is an external perspective view of an electronic component 10a according to the modification. FIG. 5 is an exploded perspective view of a laminate 12 in the electronic component 10a of FIG. 4. In the following, a laminating direction of the laminate 12 is defined as a y-axis direction. When viewing the laminate 12 in a plan view in the y-axis direction, a direction of a long side of the laminate 12 is defined as an x-axis direction. When looking at the laminate 12 in a plan view in the y-axis direction, a direction of a short side of the laminate 12 is defined as a z-axis direction.

The electronic component 10a differs from the electronic component 10 by further including external electrodes 15a and 15b as illustrated in FIG. 4. The electronic component 10a is described below primarily with respect to this difference.

As illustrated in FIG. 5, the capacitor conductor 18a further includes a lead-out portion 24a. The lead-out portion 24a projects towards the positive side in the z-axis direction from a long side of the capacity portion 20a on the positive side in the z-axis direction at a position near an end of that long side on the negative side in the x-axis direction, and also projects towards the negative side in the x-axis direction from the short side of the capacity portion 20a on the negative side in the x-axis direction at a position near an end of that short side on the positive side in the z-axis direction. The lead-out portion 24a is led out to the long side of the dielectric layer 16 on the positive side in the z-axis direction and is also led out to the short side of the dielectric layer 16 on the negative side in the x-axis direction. Furthermore, the lead-out portion 24a is led out to a corner at which the above-mentioned long side and the above-mentioned short side of the dielectric layer 16 intersect. The lead-out portion 24a includes an exposed portion 28a that is exposed between adjacent two of the dielectric layers 16 in the end surface S3 and the top surface S5 of the laminate 12.

As illustrated in FIG. 5, the capacitor conductor 18b further includes a lead-out portion 24b. The lead-out portion 24b projects towards the positive side in the z-axis direction from a long side of the capacity portion 20b on the positive side in the z-axis direction at a position near an end of that long side on the positive side in the x-axis direction, and also projects towards the positive side in the x-axis direction from the short side of the capacity portion 20b on the positive side in the x-axis direction at a position near an end of that short side on the positive side in the z-axis direction. The lead-out portion 24b is led out to the long side of the dielectric layer 16 on the positive side in the z-axis direction and is also led out to the short side of the dielectric layer 16 on the positive side in the x-axis direction. Furthermore, the lead-out portion 24b is led out to a corner at which the above-mentioned long side and the above-mentioned short side of the dielectric layer 16 intersect. The lead-out portion 24b has an exposed portion 28b that is exposed between adjacent two of the dielectric layers 16 in the end surface S4 and the top surface S5 of the laminate 12.

The outer electrode 15a is arranged to extend over respective portions of the end surface S3 and the top surface S5 of the laminate 12 while covering the exposed portion 28a. However, the outer electrode 15a does not protrude from the end surface S3 or the top surface S5, and it is not disposed on the lateral surfaces S1 or S2, the end surface S4, or the bottom surface S6. Accordingly, the outer electrode 15a preferably has a substantially L-shape when viewing the outer electrode 15a in a plan view in the y-axis direction. The outer electrode 15a is preferably formed by a plating process, for example. The outer electrode 15a is preferably made of, e.g., Cu.

Moreover, a portion of the outer electrode 15a, which is disposed on the end surface S3, is denoted as an "end surface portion 32*a*". An area of the end surface portion 32*a* is preferably in a range of about 6.6% to about 35.0%, for example, of that of the end surface S3.

The outer electrode 15*b* is arranged to extend over respective portions of the end surface S4 and the top surface S5 of the laminate 12 while covering the exposed portion 28*b*. However, the outer electrode 15*b* does not protrude from the end surface S4 or the top surface S5, and it is not disposed on the lateral surfaces S1 or S2, the end surface S3, or the bottom surface S6. Accordingly, the outer electrode 15*b* preferably has a substantially L-shape when viewing the outer electrode 15*b* in a plan view in the y-axis direction. The outer electrode 15*b* is preferably formed by a plating process, for example. The outer electrode 15*b* is preferably made of, e.g., Cu.

Moreover, a portion of the outer electrode 15*b*, which is disposed on the end surface S4, is denoted as an "end surface portion 32*b*". An area of the end surface portion 32*b* is preferably in a range of about 6.6% to about 35.0%, for example, of that of the end surface S4.

The electronic component 10*a* can be mounted on the circuit board 100 such that the outer electrodes 14*a* and 14*b* are fixed to the lands 104*a* and 104*b* by the solder 110*a* and 110*b*, respectively, or can be mounted on the circuit board 100 such that the outer electrodes 15*a* and 15*b* are fixed to the lands 104*a* and 104*b* by the solder 110*a* and 110*b*, respectively. Stated another way, the top surface S5 and the bottom surface S6 of the electronic component 10*a* can be optionally used as the mounting surface.

However, from the viewpoint of reducing the height in the z-axis direction, the electronic component 10 is superior to the electronic component 10*a*. In the electronic component 10, the outer electrodes 15*a* and 15*b* are not provided. Therefore, the height of the electronic component 10 is less than that of the electronic component 10*a* by an amount corresponding to the thickness of the outer electrodes 15*a* and 15*b*.

Preferred embodiments of the present invention are usefully practiced as an electronic component and are particularly advantageous to prevent inclination of the electronic component relative to a circuit board when the electronic component is mounted, and further to prevent formation of a crack in a solder after the soldering.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a substantially rectangular parallelepiped body including a top surface and a bottom surface opposed to each other, a first end surface and a second end surface opposed to each other, and a first lateral surface and a second lateral surface opposed to each other;
   a first outer electrode arranged to extend over respective portions of the bottom surface and the first end surface, the first outer electrode not being disposed on the top surface or the second end surface;
   a second outer electrode arranged to extend over respective portions of the bottom surface and the second end surface, the second outer electrode not being disposed on the top surface or the first end surface; and
   a capacitor, including a plurality of capacitor conductors, provided in the body; wherein
   each of the first outer electrode and the second outer electrode includes a first plating film that is directly connected to respective ones of the plurality of capacitor conductors;
   an area of a first end surface portion of the first outer electrode disposed on the first end surface, and an area of a second end surface portion of the second outer electrode disposed on the second end surface are in a range of about 6.6% to about 28.8% of an area of the first end surface and an area of the second end surface, respectively; and
   a width of the first end surface portion of the first outer electrode and a width of the second end surface portion of the second outer electrode are in a range of about 73.8% to about 96.0% of a width of the first end surface and a width of the second end surface, respectively.

2. The electronic component according to claim 1, wherein the body is defined by a laminate including a plurality of insulator layers.

3. The electronic component according to claim 2, wherein the plurality of insulator layers are laminated in a direction perpendicular to the first lateral surface and the second lateral surface.

4. The electronic component according to claim 2, wherein each of the plurality of insulator layers is made of a dielectric ceramic.

5. The electronic component according to claim 4, wherein the dielectric ceramic includes at least one of BaTiO3, CaTiO3, SrTiO3, and CaZrO3 as a main component.

6. The electronic component according to claim 5, wherein the dielectric ceramic further includes at least one of Mn compound, a Fe compound, a Cr compound, a Co compound, and a Ni compound as a minor component.

7. The electronic component according to claim 2, wherein each of the plurality of insulator layers has a thickness in a range of about 0.5 μm to about 10 μm.

8. The electronic component according to claim 2, wherein the plurality of capacitor conductors are disposed on respective ones of the plurality of insulator layers.

9. The electronic component according to claim 8, wherein the plurality of capacitor conductors are made of at least one of Ni, Cu, Ag, Pd, an Ag—Pd alloy, or Au.

10. The electronic component according to claim 8, wherein each of the plurality of capacitor conductors has a thickness in a range of about 0.3 μm to about 2.0 μm.

11. The electronic component according to claim 8, wherein each of the plurality of capacitor conductors includes a substantially rectangular capacity portion that is positioned inwardly of an outer edge of a respective one of the plurality of insulator layers without extending to the outer edge, and a lead-out portion that extends to at least a portion of the outer edge.

12. The electronic component according to claim 11, wherein each of the lead-out portions is connected to one of the first and second outer electrodes.

13. The electronic component according to claim 11, wherein at least one of the lead-out portions is led out to a long side, a short side, and a corner at which the long side and the short side intersect of the respective one of the plurality of insulator layers.

14. The electronic component according to claim 1, further comprising:
   a third outer electrode arranged to extend over respective portions of the top surface and the first end surface, the third outer electrode not being disposed on the bottom surface or the second end surface; and a fourth outer electrode arranged to extend over respective portions of the top surface and the second end surface, the fourth outer electrode not being disposed on the bottom surface or the first end surface; wherein an area of a third end surface portion of the third outer electrode disposed on the first end surface and an area of a fourth end surface portion of the fourth outer electrode disposed on the second end surface are in a range of about 6.6% to about 35.0% of an area of the first end surface and an area size of the second end surface, respectively.

15. The electronic component according to claim 1, wherein the first and second end surfaces have lengths that are less than lengths of each of the top surface, the bottom surface, and the first and second lateral surfaces.

16. The electronic component according to claim 1, wherein the first plating film is directly disposed on the body.

17. The electronic component according to claim 16, wherein the first plating film includes at least one of Cu, Ni, Sn, Pb, Au, Ag, Pd, Bi, and Zn, or an alloy containing any Cu, Ni, Sn, Pb, Au, Ag, Pd, Bi, or Zn.

18. The electronic component according to claim 16, wherein the first and second outer electrodes further include a second plating film disposed on the first plating film.

19. The electronic component according to claim 18, wherein the second plating film includes at least one of Cu, Ni, Sn, Pb, Au, Ag, Pd, Bi, and Zn, or an alloy containing any Cu, Ni, Sn, Pb, Au, Ag, Pd, Bi, or Zn.

* * * * *